April 3, 1951 — J. R. MOORE — 2,547,654
RESOLVER FOR GUN SIGHT
Filed June 28, 1943 — 8 Sheets-Sheet 2

Fig. 2.

Inventor:
John R. Moore,
by Harry E. Dunham
His Attorney.

April 3, 1951  J. R. MOORE  2,547,654
RESOLVER FOR GUN SIGHT
Filed June 28, 1943  8 Sheets-Sheet 5

Inventor:
John R. Moore,
by Harry E. Dunham
His Attorney.

April 3, 1951  J. R. MOORE  2,547,654
RESOLVER FOR GUN SIGHT
Filed June 28, 1943  8 Sheets-Sheet 6

Inventor:
John R. Moore,
by Harry E. Dunham
His Attorney.

April 3, 1951  J. R. MOORE  2,547,654
RESOLVER FOR GUN SIGHT
Filed June 28, 1943  8 Sheets-Sheet 7

Inventor:
John R. Moore,
by Harry E. Dunham
His Attorney.

April 3, 1951      J. R. MOORE      2,547,654
RESOLVER FOR GUN SIGHT
Filed June 28, 1943      8 Sheets-Sheet 8

Inventor:
John R. Moore,
by Harry E. Dunham
His Attorney.

Patented Apr. 3, 1951

2,547,654

UNITED STATES PATENT OFFICE 2,547,654

RESOLVER FOR GUN SIGHT

John R. Moore, Schenectady, N. Y., assignor to General Electric Company, a corporation of New York Application June 28, 1943, Serial No. 492,518

9 Claims. (Cl. 33—49)

1

This invention relates in general to a resolving mechanism, and it contemplates the provision of an improved mechanism of this character which is of simplified construction and which may be used in a variety of applications.

While it is more generally applicable, this invention is particularly useful in solving the problems encountered in gunfire control. Thus, for example, it may be used to compensate for ballistic corrections to offset the gun bore, that is the line of fire of the gun, with relation to the line of target position determined by a target tracking mechanism, as required by the effects of the forces of the wind and gravity on the projectile.

Hereinafter, the terminology "sighting device" will be used in a generic sense to cover various forms of tracking mechanisms, both of the visual and automatic type, and the terminology "line of sight" will be used to cover the line of target position determined by these devices.

Among other gunfire applications, this invention is applicable to control the angularity between the line of sight of the sighting device and the line of fire of the gun, as required by parallax existing between the sighting station and the gun.

In general, this mechanism comprises a pair of bases relatively rotatable about a common axis. A rigid member, which I shall call the resolver bar, has one end connected to one of the bases by means of a universal joint which permits relative angular movement between the bar and the base through a wide cone. Moreover, this connection is radially adjustable with reference to the aforementioned common axis. At an outer point of the bar there is a second universal joint which connects the bar with a second rigid member, which I shall call the control member, and which is connected to the second base; this control member is connected to its base for relative pivotal movement between them in one direction only about an axis intersecting and positioned at right angles to the aforementioned axis.

In view of the foregoing arrangement, the angular relation of the resolver bar with relation to the control member depends upon the radial offset with reference to the aforementioned common axis of the connection point of the resolver bar with the first base; the relative angular positions of the two bases; and the angular position of the control member with relation to its base.

Further in certain forms of the invention, the universal joint which connects the resolver bar and control member is adjustable along the lengths of these members, but always parallel to

2 the control member so as to effect further adjustments in the angular relation between the resolver bar and control member.

As an example of its use, let it be assumed that the mechanism is to be used in aircraft gunnery to compensate the line of sight of a gun sighting mechanism with relation to the gun bore to compensate for the effects of the forces of relative wind and of gravity acting on a projectile fired from the gun. Here, the resolver bar corresponds to the line of sight, and the control member to the gun, that is, it is a mimic gun. The two bases are adjusted angularly to each other in accordance with the azimuth position of the gun on the aircraft, and the mimic gun is moved relatively to the second base through the angle of elevation of the gun.

Now, if the universal joint between the resolver bar and the mimic gun be adjusted along the length of the resolver bar and parallel to the mimic gun, that is, parallel to the gun's bore, in accordance with a function of the range of the target, and the universal joint connecting the resolver bar with the first base be adjusted radially in accordance with the aircraft's velocity, modified by air density, then the resolver bar axis makes the proper offset angle with the mimic gun to compensate for the wind effect. In other words, the bar continuously resolves or generates the angular relationship between the line of sight of the sighting mechanism and the gun bore, as required by the wind force acting on the projectile and it does this irrespective of the movements of the gun in azimuth and elevation with relation to the aircraft.

In view of the fact that the effect of gravity is a constant force acting on the projectile in a constant direction, the resolver bar is given a predetermined adjustment to compensate for this effect. This adjustment is effected by displacing the universal joint between the resolver bar and the first base from the elevation axis of movement of the mimic gun relative to its base so that an adjustment is made between the axes of the resolver bar and mimic gun to make the gravity correction, irrespective of the range setting, and the angular positions of the two bases relative to each other and of the mimic gun to its base.

It is stressed here again that the foregoing is merely an example of use of this resolver mechanism, and that it may be used for other gun control purposes, such as correcting for parallax, and further it may be used for other calculating purposes.

For a more complete understanding of the invention, reference should be made to the accompanying drawings in which Fig. 7 is a sectional view taken through the line 7—7 of Fig. 4 and looking in the direction of the arrows; Fig. 8 is a plan view of a portion of the mechanism shown in Fig. 4, and is the same as the lower element shown in Fig. 6, but having certain elements in different operative positions.

Figure 1:
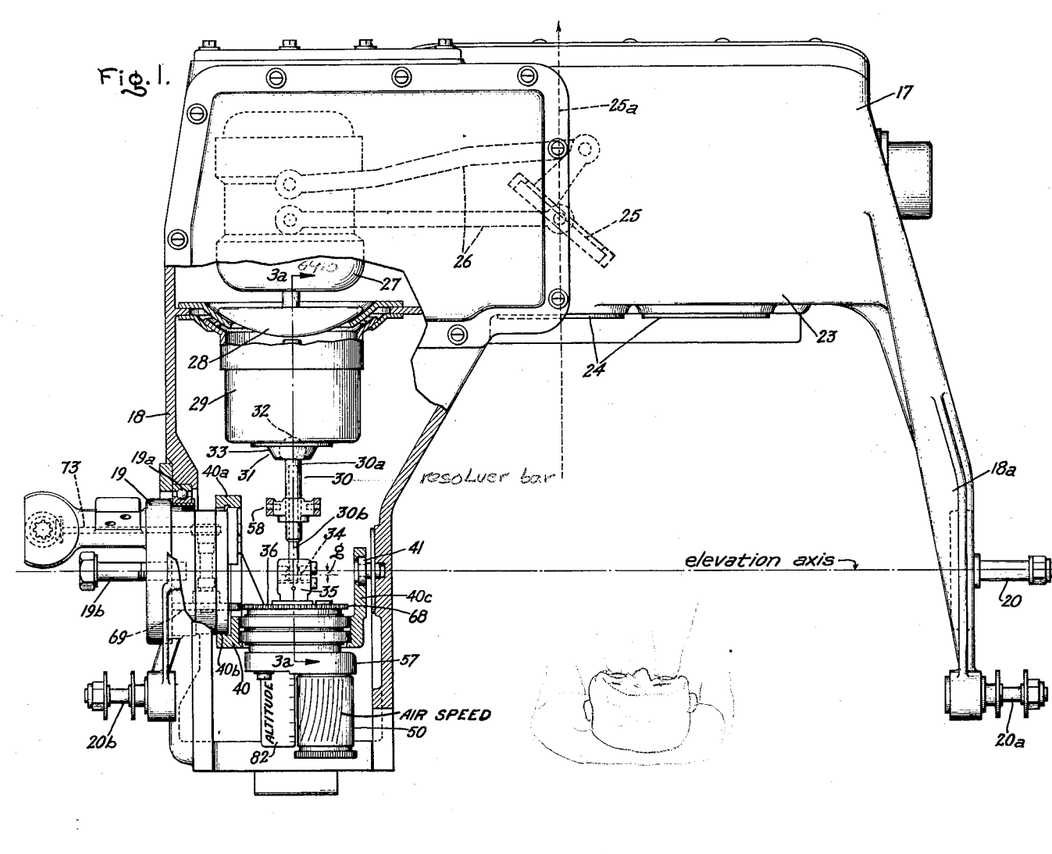
Fig. 1 is an elevation of a gun control sighting device provided with resolver mechanism embodying this invention and which is incorporated in the sighting device in order to compensate for the effects of wind and gravity on the projectile.
Figure 2:
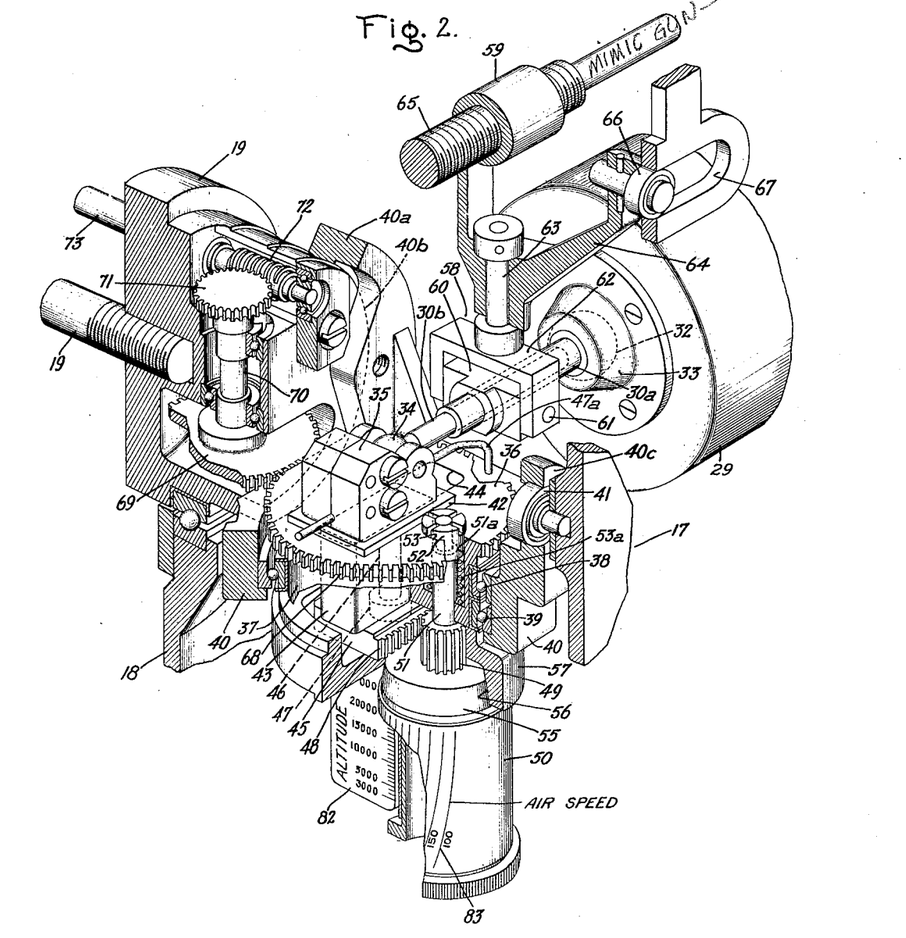
Fig. 2 is a perspective view of a portion of the mechanism shown in Fig. 1, the figure being drawn to a larger scale than Fig. 1, and parts being shown in section so as to illustrate certain details of construction.
Figure 3:
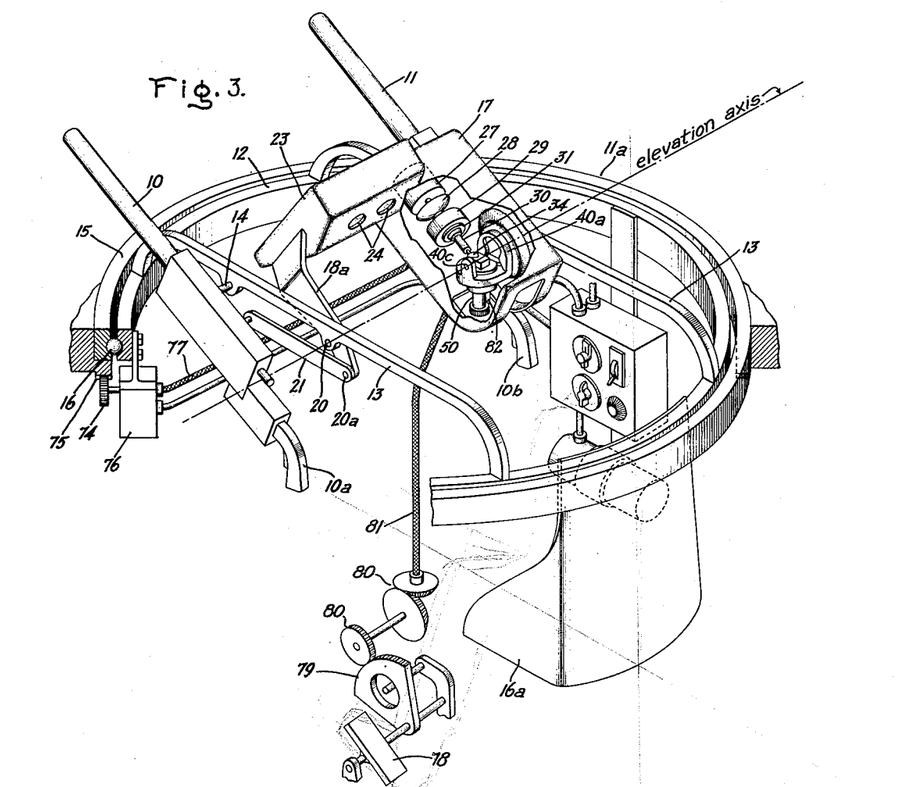
Fig. 3 is a perspective view illustrating the sighting mechanism of Figs. 1 and 2 as applied to control automatic machine guns mounted in the turret of an airplane.
Figure 3A:
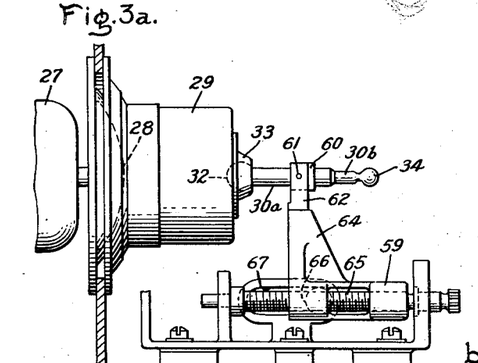
Fig. 3a is a sectional view taken through the line 3a—3a of Fig. 1, and looking in the direction of the arrows.

The modification of the invention illustrated in Figs. 1, 2 and 3 is used to adjust the position of a gun's bore relative to the line of sight to a target of the gun's controlling sighting mechanism in order to compensate for the forces of wind and gravity acting on the projectile fired from the gun.

Figure 16:
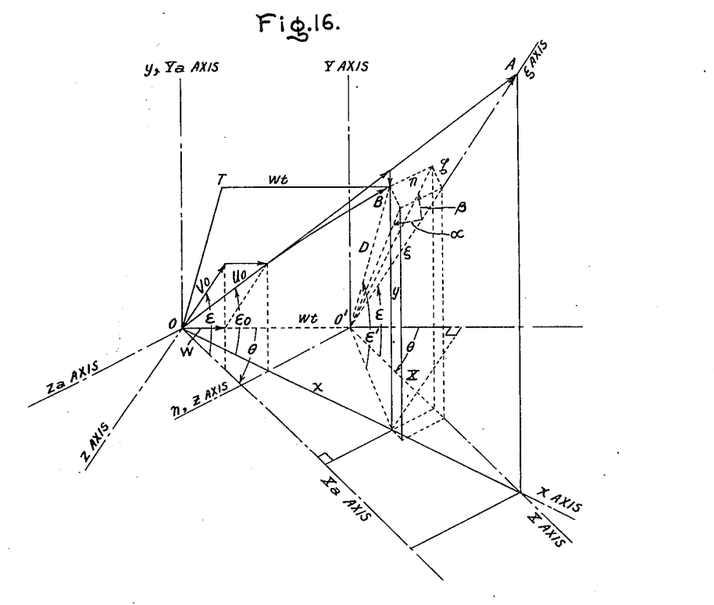
Fig. 16 is a vector diagram which illustrates the geometry of the ballistic corrections involved in the problem of orienting a gun.

The battle problem is illustrated graphically in Fig. 16. This figure shows by a three-dimensional picture the configuration of space vectors and angles which are used in the calculation of the gun-sight orientation. It is assumed that the gun orientation is known, along with the time of flight $t$ of the projectile and the velocity W of the gun relative to the air. The problem is to find the angular orientation of the target relative to a coordinate system fixed in the gun's aeroplane at the instant of firing so that a hit will be scored on the target $t$ seconds after the gun has been fired, if the target velocity vector is constant and equal in magnitude and direction to the gun velocity vector at the instant of firing. Any departure of the target's motion from this assumption is corrected separately by suitable lead computing means with which we are not concerned here.

Three distinct coordinate systems are used in Fig. 16. These are: the $x, y, z$ system, most useful for orienting the projectile with respect to the air; the X, Y, Z system, most useful for orienting the gun relative to the aeroplane, and the $\xi, \eta, \zeta$ system, most useful for orienting the projectile relative to the gun.

The $x, y, z$ system is considered fixed in the air with its $y$ axis vertical. The origin lies at the center of the gun trunnions at the instant of firing. The $x$ axis is formed by the trace of the vertical plane containing the projectile velocity vector relative to the air (the line of departure relative to the air) and the horizontal plane. The $z$ axis lies in the horizontal plane and is perpendicular to the $x, y$ plane. It completes a right-handed system of Cartesian coordinates.

At the instant of firing the XYZ coordinate system is fixed with its origin at the center of the gun trunnions. The Y axis is vertical and lies along the gun azimuth axis. The X axis is perpendicular to the Y axis in the vertical plane centering the Y axis and the gun. It thus forms the intersection of the vertical plane through the gun with the horizontal plane. The Z axis is perpendicular to the XY vertical plane and completes a right-handed system of Cartesian coordinates. This system moves with a constant vector velocity W equal to that of the gun at the instant of firing.

At the instant of firing the $\xi, \eta, \zeta$ system of coordinates is also fixed with its origin at the center of the gun trunnions. The $\xi$ axis lies along the gun bore axis. The $\zeta$ axis lies in the vertical plane containing the gun bore axis and is perpendicular to it. The $\eta$ is perpendicular to the $\zeta \xi$ plane in the horizontal plane. This system moves with a constant velocity vector equal to that of the gun at the instant of firing.

At the instant of firing the gun is at O moving with a vector velocity W. The gun points along the $\xi$ axis and the projectile muzzle velocity is V₀ along this axis. The initial velocity of the projectile relative to the air is $u_0$. This is the vector sum of W and V₀. The elevation of the gun is $\epsilon$, being the angle between the X axis and the $\xi$ axis, measured from the X axis positive upward. The relative air velocity vector $u_0$ makes an angle $\epsilon_0$ with the horizontal plane. The angle between the X axis and the line of motion of the X and $\xi$ coordinate systems (the gun azimuth angle at the instant of firing) is θ. The reason a distinction is made between the motion of the coordinate system and the motion of the gun any time after the instant of firing (i. e., the reason it has not been stated that the $\xi$ and X systems are rigidly attached to the gun) is that the gun may be moving in a curved path, whereas if the ballistic problem is to be separated from the problem of predicting the target's future position (the problem solved by a lead computer with which we are not here concerned) the target must be fixed in a coordinate system moving at constant velocity equal to that of the gun at the instant of firing.

The projectile starts out along the line OA with the velocity $u_0$. At the end of $t$ seconds it would be at point A if no disturbing forces had acted upon it. However, gravity causes it to drop and air-resistance retards it so that instead of arising at A in $t$ seconds the projectile ends up at B, having followed the arc OB. In this time the $\xi$ and X coordinate systems move to O'; a distance W$t$. This causes the projectile, if viewed by an observer in the X and $\xi$ coordinate system to appear to lag behind the $\xi$ axis and is observed along D. Its position is $\xi$, $\eta$, $\zeta$, in the $\xi$ system. By definition $\eta$, the lateral deviation is the distance of B to the right of the vertical plane through $\xi$. Correspondingly, $\zeta$, the vertical deviation is the distance of B above the plane which intersects the vertical plane perpendicularly along $\xi$. The actual distance of B from O' is D. By definition $\alpha$ is the lateral deflection and $\beta$ is the vertical deflection. It will be noted that $\alpha$ is the angle of deflection measured in the traverse plane which is a slant plane through the gun bore axis, and that $\beta$ is measured in the vertical plane through the gun bore axis.

It is one function of the resolver mechanism of the invention shown in Figs. 1–3 to generate mechanically and continuously the lateral and vertical deflection angle $\alpha$ and $\beta$, or to generate linear offsets which are proportional to them.

Referring more particularly to Figs. 1–3 inclusive, this invention has been shown as applied to sighting mechanism arranged generally as described and claimed in the copending application of Charles S. Grimshaw, Serial No. 473,043, filed January 11, 1943 and assigned to the same assignee as the present invention; as there fully described that sighting mechanism controls the line of sight with relation to the gun in order to compensate both for the effects of the velocity of the target known as "lead" and also for the ballistic corrections which are, as indicated previously, the effects of the forces of wind and gravity on the projectile. That application discloses a ballistic computer which incorporates the features of the present invention and it utilizes this ballistic computer, as well as a lead computer in order to shift the position of the line of sight with relation to the gun bore by means of a gyroscopically controlled element.

As shown more particularly in Fig. 3, this invention has been shown in its first embodiment as applied to the control of machine guns 10 and 11 (Fig. 3) arranged in parallel relation, as shown, and supported to move in elevation on a common elevation axis in a suitable turret 11a. The turret has a rotatable ring 12 on which the guns are mounted by means of supporting arms 13. The ends of these arms are attached to the ring 12 and they pivotally support the guns by shafts 14 for movement in elevation on a common axis. The ring 12 is rotatably mounted in a fixed turret ring 15 by means of bearings 16 so that the guns can be swung in azimuth about a vertical axis directed through the common center of the two rings 12 and 15. It will be understood that the gunner and observer will sit in the turret upon a suitable seat 16a and will grasp the handles 10a, 10b of the two guns to move the guns and turret in azimuth, and to elevate the guns with reference to the turret, all in order to direct the guns generally toward the target. As will be seen later the guns' bores are not pointed directly at the present position of the target, but are deviated with reference to the line of sight to the target in order to compensate for ballistics and velocity of the target so that a hit may be scored.

The major portion of the elements of the Grimshaw sighting mechanism, as well as the ballistic computer of the present invention, are mounted within a casing 17. This casing 17 has a pair of spaced-apart supporting arms 18 and 18a which pivotally mount the casing on the supporting arms 13 for the guns. As shown in Fig. 1, the arm 18 is mounted upon a fixed member 19 which supports a bearing 19a for the arm. This fixed member 19 is rigidly attached to the right-hand turret supporting arm 13 of Fig. 3 by means of a bolt 19b. The other arm 18a is provided with a shaft 20 which functions to pivot it upon the opposite turret arm 13. The arm 18a is extended beyond its pivotal mounting, as shown in Figs. 1 and 3, and on the end of this extension it carries a pin 20a which is connected by means of a link 21 to the gun 10. The other arm 18 has a similar extension carrying a pin 20b which is connected by a similar link (not shown) to the gun 11. Thus, when the guns 10 and 11 are moved in elevation about their shafts 14, the casing 17 is moved in elevation through the same angle with the guns and on an axis parallel to the guns' elevation axis. The casing 17, of course, moves with the guns in azimuth in a rigid system with them.

The casing 17 at the right, as viewed in Fig. 1, and at the left, as viewed in Fig. 3, has a sighting section 23 which is provided with a pair of sight openings 24 of which the observer sits in the seat 16a and through which he observes the target. Mounted within this sight section opposite the left-hand sight opening, as viewed in Fig. 1, is a transparent reflector member 25 (Fig. 1) which is formed of clear glass and through which the observer views the target, the line of sight to the target being indicated by the numeral 25a. The position of this transparent sighting member relative to the casing is controlled by mechanical connection means 26 from a gyroscope 27.

This gyroscope carries and operates an eddy current disk 28 which coacts with a magnet 29, the eddy current disk 28 and the magnet 29 forming a magnetic coupling between the gyroscope and the frame or casing 17. As explained fully in the aforementioned Grimshaw application, the speed with which the frame 17 is moved by the guns 10 and 11 as the observer keeps the line of sight on the target and the strength of the magnet coupling controls the position of the gyroscope with reference to the frame 17, and hence, controls the angularity between the line of sight and the bores of the guns 10 and 11 with which the frame 17 moves in a rigid system. This introduces the correction for the target's velocity, that is lead.

Furthermore, the position of the gyroscope, and hence the direction of the line of sight with reference to the gun bores are controlled by shifting the position of the magnet 29 in order to introduce corrections for the forces of wind and gravity acting on the projectile during its time of flight to the target.

This invention concerns itself solely with the means which are used to control the position of the magnet to introduce ballistic corrections.

This mechanism comprises a resolver bar 30 (Figs. 1 and 3), which has a section 30a. One end of this section, as shown, has a universal connection 31 lying in the magnetic axis of the gyroscope, and defined by a ball 32 on the end of the section 30a and received in a socket 33 formed on the end of the magnet, as shown more clearly in Fig. 1.

The resolver bar 30 further comprises a section 30b which is telescoped into the section 30a. This section also at its outer end carries a sphere 34 which is mounted in a socket 35. The sphere 34 and its socket 35 constitute a universal joint between this end of the resolver bar and an azimuth disk 36 shown more clearly in Fig. 2.

This disk 36 has a depending solid cylindrical reduced section 37 which is mounted in bearings 38 and 39 which function to support the disk for rotary motion in a carriage 40. This carriage is generally circular, but has at one side an upright section 40a, as shown in Figs. 2 and 3, and which is provided with an opening defining a curved surface 40b which engages a supporting surface provided for it on the fixed support 19; this section is rigidly secured to the fixed support 19 by any suitable means, such as bolts. At its opposite side the carriage 40 carries an upright arm 40c having a circular opening therein which is journaled on a bearing 41 (Fig. 2) that is mounted in the arm 18 of the frame 17. Because of this arrangement, the carriage 40 and the azimuth disk 36 are fixed to the turret arm 13, while the frame 17 is free to move in elevation independently of them. In other words, the azimuth disk is not moved in elevation at all, its sole movement being an azimuth movement relative to the guns.

The socket 35 mounting the spherical end 34 of the resolver rod 30 is located upon a plate 42 which is mounted upon the top surface of the azimuth disk 36. Depending from this plate is a rectangular-shaped column 43 which extends through a diametral slot 44 formed in the azimuth disk 36, the slot extending downwardly through the disk's solid extension 37. The proportions of the plate 42 and of the slot 44 are such that the plate functions to suspend the column from the top surface of the azimuth disk. Secured to the bottom of the column 43 is a plate 45 which projects beyond the opposite sides of the column, these opposite extensions and the overhanging edges of the plate 42 functioning to securely mount the column 43 on the azimuth member 36, 37. Further, the sides of the column have a sliding fit in the slot so that while the column can be adjusted lengthwise in the slot, it cannot rotate in it.

The spherical seat 35 itself is attached to a cylindrical column 46 which is directed downwardly through the column 43, and at its lower end it carries a collar 47 which functions to clamp the socket 35 and the pin 46 to the column. In other words, the socket member 35 moves transversely with the column when the latter is adjustable in the slot 44, but it is perfectly free to rotate relative to the post 43 through the longitudinal axis of the pin 46. This means provides for adjustment of the end of the resolver rod 30 that is attached to the azimuth disk radially with reference to the central axis of the disk, irrespective of the position of the resolver rod in space. A pin 47a is fixed to the carriage 40 and extends transversely across the azimuth disk 36 and through an opening provided for it in the socket 35; this functions to align the socket with the resolver rod 30, and thereby prevents binding of the sphere 34 and socket.

The column 43 is adjustable radially in slot 44 by means of a rack 48 formed on the right-hand extension of the plate 45, as viewed in Fig. 2, and with which meshes a spur gear 49 that is mounted on the top of an adjustment drum 50. A pin 51 projects upwardly from the spur gear 49 through a bore 51a provided for it in the azimuth member 36, 37, and which has a head 52 at its top that extends through an aperture 53 provided for it in the azimuth disk. The bore is enlarged through an intermediate length of the pin, and mounted in this enlargement is a compression spring 53a which acts on the head 52 to bias the gear 49 and the attached drum 50 upwardly, as viewed in Fig. 2. When the drum 50 is thus biased upwardly it is locked in position by a friction clutch which is defined by a frusto-conical section 55 formed on the top of the drum 50 and which coacts with a complementary seat 56 formed in a member 57 which is rigidly secured to the bottom of the azimuth disk extension 37. When it is desired to adjust the position of the universal mounting for the resolver rod radially with reference to the azimuth disk, the drum 50 is pulled downwardly to release it from its friction drag and then is turned which turning movement operates the rack 48 to adjust the position of the column 43 and hence that of the universal mount 35.

Intermediate its ends the resolver bar 30 is connected through a universal joint 58 with an adjustable nut 59. This universal joint, as shown, comprises a collar 60 through which the rod section 30a may slide freely and which is provided with oppositely disposed pins 61 received in the two arms of a U-shaped yoke 62. The nexus of this yoke is secured to an upright pin 63 which is journaled in a frame member 64. The frame 64 is rigidly secured to the nut 59.

The nut 59 is threaded upon an adjusting screw 65 which is provided with journals in the frame 17, and arranged so that its longitudinal axis of rotation lies in a direction parallel to the bores of the guns 10 and 11. To insure this parallel relation the frame 64 carries a guide roller 66 which rides in a guide track 67 that is rigidly attached to the casing 17.

While the azimuth disk 36 is mounted upon the carriage 40 which in turn is fixed to the turret so as to move with it in azimuth, and is free from influence by the motion of the frame 17 in the vertical direction, it nevertheless is provided with means for controlling its motion with relation to the motion of the turret in azimuth, for a purpose to be discussed in greater detail hereinafter; as shown, the outer periphery of the azimuth disk is provided with a spur gear 68 with which meshes a driving spur gear 69 mounted in the fixed member 19. The spur gear 69 is secured to one end of a drive shaft 70 which at its opposite end has a driving worm gear 71 that meshes with a worm 72 fixed upon a drive shaft 73 that is mounted in the fixed member 19.

It will be observed here that this mechanism follows the general description of the invention given previously in that there is provided a resolver bar 30 which has a universal joint connection with a first base—the azimuth disk 36; it further comprises a control member—the adjusting screw 65—which is parallel to the bores of the guns 10 and 11 and which is rigidly attached to the frame 17 so as to move with it and with the guns; in other words, the screw 65 constitutes the mimic gun referred to in the general description given before; and the universal connection 58 constitutes the universal joint between the resolver rod and the mimic gun heretofore referred to. Moreover, the turret ring 12 constitutes the second base member to which the control member 65, corresponding to the mimic gun, is secured through the frame 17, for movement in elevation about the bearings 19 and 20.

Now it will be observed that if the turret be moved in azimuth relative to the disk 36 through the gun azimuth angle $\theta$, and if the frame 17 be moved in elevation through the gun elevation angle $\epsilon$ then the resolver rod 30 will take an angular position with relation to the axis of the screw 65, which angular position will depend upon the angles $\theta$ and $\epsilon$, and further both upon the radial offset of the spherical seat 35 with reference to the axis of the azimuth disk, and with the adjustment of the nut 59 along the length of the screw 65.

Now if the spherical seat 35 be radially offset in accordance with the altitude and air speed of the aircraft so that it is adjusted for the aircraft's velocity, modified for air density, and if the collar 60 be adjusted along the resolver rod in accordance with a function of range, then at all times the angularity of the resolver rod with relation to the axis of the screw 65 will generate the proper angular offset $\alpha$ and $\beta$ to compensate for wind effects, provided always that the relative angular positions between the azimuth disk and the turret are the azimuth angles $\theta$ of the guns, and provided the casing 17 be adjusted in elevation in accordance with the angles of elevation $\epsilon$ of the guns.

Now it has been pointed out previously that the sight frame 17 and hence the screw 65 must be adjusted with the guns 10 and 11 in elevation, because of the link connections 21 between the guns and the sight frame.

To insure that the angle between the azimuth disk 36 and the turret is always the azimuth angle $\theta$ of the guns, the azimuth disk 36 is driven from the turret as the turret is moved in azimuth so that it retains a fixed position with reference to the aeroplane. In other words, as the disk 36 is swung about the vertical central axis of the turret with the frame 17 it is rotated about its own vertical axis so that the slot 44 always remains in a fixed direction with reference to the aircraft. This is accomplished by means of a drive between the turret and the shaft 73 comprising a spur gear 74 (Fig. 3) which meshes with a circular rack 75 provided on the fixed turret ring 15. This spur gear is mounted on a frame 76 carried by the movable turret ring 12, and it is connected by a flexible drive shaft 77 with the shaft 73. The gearing interposed between the fixed ring 15 and the azimuth disk 36 is such that irrespective of the position of the guns 10 and 11 in azimuth the azimuth disk will remain fixed with reference to the aeroplane; more specifically, the drive is constructed and arranged so that when the sight is moved in azimuth, the azimuth disk 36 is driven in a 1:1 speed ratio with the turret, and in a reverse sense so that it remains fixed with reference to the fixed turret ring 15.

As fully pointed out in the copending Grimshaw application, that sight includes means for finding the range of the target. It is unnecessary for an understanding of this invention to describe here this means fully, but the means comprises a light source and means for defining in the field of view of the observer a reticle image which may be adjusted in size by means of a foot pedal 78 (Fig. 3) that drives the range finder through a rack segment 79, gearing 80 and a flexible shaft 81. At the same time that the shaft 81 is operated to adjust the range finder to determine the target's range, it drives through connection (not shown) the range setting screw 65 so that the universal connection 58 is adjusted lengthwise along the screw in accordance with a functioning of range.

The radial offset of the spherical socket 35 is adjusted, as previously described, by adjusting the drum 50, and this is set in accordance with the altitude and air speed of the aircraft. In order to facilitate the setting, the drum coacts with an altitude scale 82, graduated in terms of thousands of feet altitude, and the drum itself is provided with an air speed scale 83 graduated in hundreds of feet per minute air speed. In order to set the device for a given altitude and air speed, the proper air speed line of sight scale 83 is moved until it intersects the proper altitude line on the altitude scale. This sets the radial position of the universal mount 35 of the resolver rod in terms of altitude and air speed.

Thus far, the mechanism described has introduced compensation for the effects of the wind force on the projectile only. Inasmuch as the force of gravity is a constant value and acts in a constant direction, it is permanently set in, and this is accomplished by positioning the center of the spherical ball 34 of the resolver rod below the elevation axis of the sight, that is, below the central axes of the circular support 19 and the pin 20, as the mechanism is viewed in Fig. 1; this distance is indicated in Fig. 1 by the letter $g$. This setting, of course, changes the angular relation between the resolver rod and the range adjustment rod 65, and it changes it in such a way as to compensate for the constant gravity force.

Figure 17:
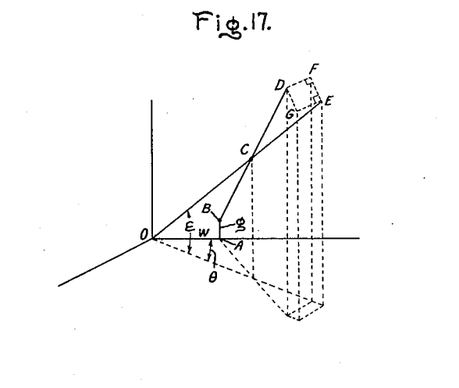
Fig. 17 illustrates vectorially the manner in which the mechanism illustrated in Figs. 1–3 operates.

A three-dimensional vector analysis of the operation of the mechanism just described is shown in Fig. 17. Here, the center of the trunnions of the mimic gun 65 is located at the point O; the gun itself is denoted by the vector OCE; its position in azimuth is denoted by $\theta$; and its position in elevation is denoted by $\epsilon$. The resolver rod 30 is denoted by the vector BCD. The universal connection 58 between the resolver rod 30 and the mimic gun 65 is at point C, while the universal connection between the resolver rod and the azimuth disk 36 is at point B. The gravity offset $g$ is indicated by the vector AB. And the wind offset is denoted by the vector OA.

Now the distance EF is proportional to the vertical deflection offset $\beta$ required between the line of sight and the gun, and the mechanism will continuously generate this offset as the angles $\theta$ and $\epsilon$ vary, and in accordance with the settings of the wind vector OA and that of the range at point C, and furthermore, in accordance with the fixed setting for gravity AB.

In a similar way, the distance DF, proportional to the lateral deflection $\alpha$, will be continuously generated.

This resolver mechanism may be used for other purposes. For example, it may be used as a parallax mechanism to compensate for parallax existing between the sighting station and the gun. If horizontal parallax exists, it is compensated by adjusting the radial offset OA to be proportional to the horizontal base line distance between the sighting station and the gun station; if vertical parallax exists, the offset AB or $g$ in Fig. 1 is adjusted to be proportional to the vertical base line distance between the sighting and gun stations. In this application the azimuth angle $\theta$ is measured from the horizontal parallax base line, rather than from the wind vector OA, or when the device is being used as a ballistic computer.

In the form of the invention illustrated in Figs. 1 to 3, the mimic gun (screw 65), and resolver rod 30, move relatively to their bases, and are moved by direct connections with the guns and the turret. Moreover, the resolver bar and mimic gun, while they are movable through 360° in azimuth, they are movable in elevation through but an angle of around 110°. In other words, this mechanism provides approximately hemispherical coverage.

It is not necessary that the device be limited in any of these respects. Thus, it may be remotely located from the guns and turret; it may be used to cover a complete sphere; and also the bases for the resolver bar and mimic gun may be moved around the resolver bar and mimic gun instead of the reverse as in the first form, that is, it may be considered that the airplane is angularly moved about the resolver bar and mimic gun rather than the reverse.

The mechanism shown in Figs. 4 to 8 will accomplish all of these things. As shown here, there is a fixed casing 85 rigidly mounted in the airplane which carries the gun and sighting mechanism.

Figure 4:
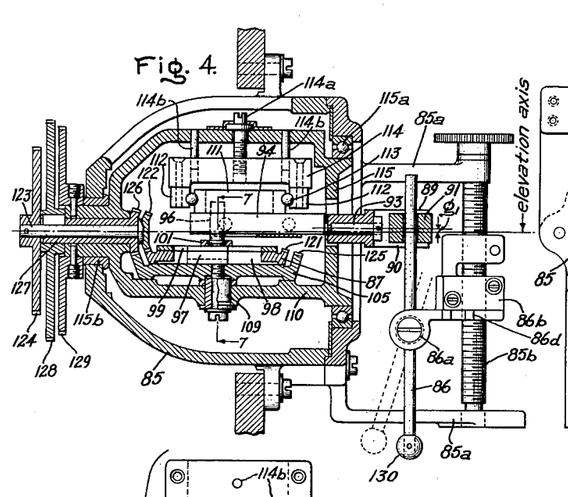
Fig. 4 is a vertical sectional view taken through resolving mechanism of modified form arranged in accordance with this invention.
Figure 5:
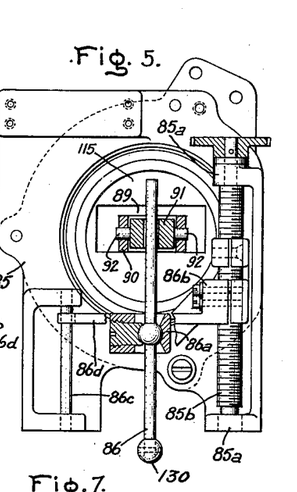
Fig. 5 is an end elevation of the mechanism shown in Fig. 4 looking from the right of the figure.
Figure 6:
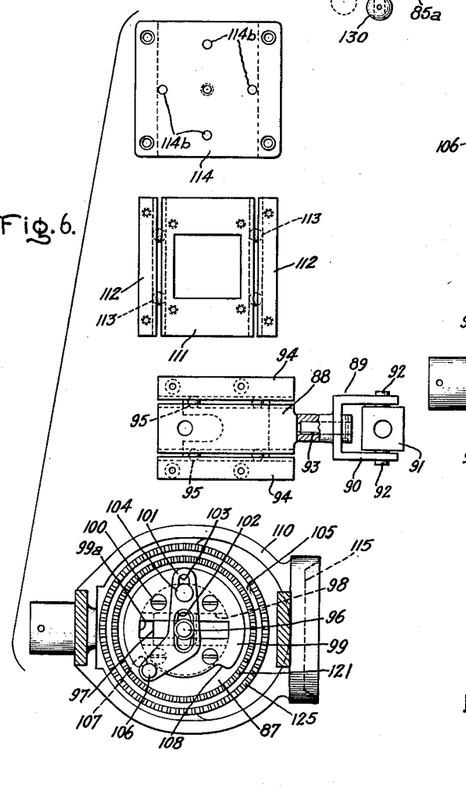
Fig. 6 is an expanded view of a series of the elements used in the mechanism of Figs. 4 and 5 illustrating the positions they occupy relative to each other and showing them in plan.

This casing carries forwardly projecting spaced arms 85a in which a screw 85b is journaled for rotation on a fixed axis. This screw corresponds to the screw 65 of the first form, and therefore is the control member, or mimic gun. A resolver bar 86 is positioned adjacent it, and is connected with it by means of a universal joint 86a. This joint is connected with a nut 86b on the screw and is guided for parallel motion with reference to the screw by means of a guide rail 86c that guides arm 86d attached to the universal joint and nut.

Mounted within the casing 85 is a disk 87. This disk is connected with the resolver bar 86 by means of a carriage 88 which has a universal joint connection 89 with the resolver bar 86. This joint 89 comprises a U-shaped yoke 90 between the two arms of which a sleeve 91 is pivotally mounted by means of diametrically positioned shafts 92. This collar 91 slidably receives the upper end of the resolver bar 86, as viewed in Fig. 4. The yoke 90 is pivoted to rotate on a pin 93 projecting outwardly from one end of the carriage 88 and thereby completes the universal connection between the resolver bar and the carriage 88. The carriage 88 is mounted for sliding movement in a pair of parallel tracks 94 by means of ball bearings 95. Its end opposite to the shaft 93 is secured to a pin 96 vertically positioned, as viewed in Fig. 4. This pin is connected to a slider block 97 arranged to travel in a diametral slot 98 provided for it in a disk member 105 and which block is retained in its operable position with reference to the disk by means of a top or cover plate 99, which is secured to the top of the disk 105 by screws 100 and which is provided with a diametral slot 99a to provide for radial movement of the pin 96. The disk 105 is located under disk 87, and the disk 87 is journaled to rotate upon the disk 105, as more clearly shown in Fig. 7.

This pin 96 is operated by a bell-crank 101. This crank, as shown, is provided in one arm with an elongated slot 102 through which the pin 96 projects. This arm of the bell-crank is also provided with an elongated slot 103 through which a pin 104 projects, which pin extends downwardly through a bore provided for it in the disk 105. The other arm of the bell crank 101 is attached to a pin 106 which is secured to the disk 87, as more clearly shown in Fig. 7. The top plate 99 is provided with a cut-out section defining stops 107 and 108 for the pin 106 to limit its travel in opposite directions.

The plate 105 is mounted for rotation upon a shaft 109 which is mounted in a supporting base or frame 110. The axis of the shaft 109 is coincident with the axis of rotation of the plate 87 that is mounted upon it.

The plate 105 corresponds to the first base of the first form of the invention, that is, to the azimuth disk 36. It will be observed that when this plate rotates it will rotate the pin 96 in a circle and this motion of the pin 96 will move the carriage 88 with it.

This displacement of the pin 96 necessarily will displace the carriage 88 and its supporting tracks 94 laterally, and to provide for this motion the tracks 94 are secured to a plate 111 which is mounted in parallel tracks 112 by bearings 113 so that the plate 111 is movable at right angles to the line of movement of the carriage 88. The tracks 112 are rigidly secured to a supporting plate 114 which is attached to the supporting frame 110. As shown, the plate is attached by means of an adjusting screw 114a, and it is guided by guide pins 114b. This connection provides for axial adjustment of the universal joint at the upper end of the resolver bar in a direction along or parallel to the azimuth axis.

The rotation of the plate 105 through the azimuth angle $\theta$ of the gun adjusts the angular position of the resolver rod 86 with relation to mimic gun 85b on its universal joint 86a in accordance with the value of this angle, and the operation and movement of this rod with reference to the mimic gun 85b is precisely the same as pictured in the lower vectorial view of Fig. 17.

When the two disks 87 and 105 are angularly moved relatively to each other, the position of the pin 106 necessarily is angularly adjusted, and this in turn adjusts the radial offset of the pin 96 with reference to the common axes of the two disks. This adjustment of the pin introduces the wind velocity, modified for air density.

Thus far, it will be observed that the displacement of the pin 96 radially with reference to the center of the plate 87 introduces the wind velocity correction factor, and that the movement of the disk 105 introduces the azimuth angle $\theta$ of the gun. The elevation angle $\epsilon$ of the gun is introduced into the mechanism by rotating the whole framework 110 with the mechanism mounted thereon within the housing 85, and upon an axis which intersects and is at right angles to the axis of the disks 87 and 105; it will be observed that the right-hand end of the frame 110 (as viewed in Fig. 4) is mounted in the fixed casing 85 by means of a bearing 115a, while the left-hand end of the frame 110 is provided with a bearing 115b which is mounted in the frame 85.

In other words, the frame 110 is the second base of this form of the invention. When this frame rotates it shifts the position of the universal joint 89 to angularly adjust the position of the resolver rod 86 with reference to the screw 85b in accordance with the angle of elevation $\epsilon$.

The disk 87 is formed with a crown gear 121 with which a bevel gear 122 meshes. This bevel gear 122 is secured to a shaft 123 to which is secured a driving gear 124. The plate 105 likewise is provided with a crown gear 125 which meshes with a bevel gear 126 which is attached to a shaft 127 which is driven by a gear 128. The frame 110 is driven by a gear 129.

In the operation of this form of the invention, the gear 128 drives the disk 105 through the azimuth angle $\theta$ of the gun; the gear 124 also drives the disk 87 through this angle, but in addition it adds the wind velocity vector in terms of altitude and air speed to adjust the two disks relatively to each other so as to give the pin 96 the correct radial offset; and the gear 129 drives the frame 110 through the elevation angle $\epsilon$.

It will be understodo that these various gears may be driven by any suitable mechanism, such as mechanical differential drives from the gun, or by means of electric follow-up motors driven by motion transmitters at the gun.

Also, it will be understood, of course, that the range screw 85b will be driven by any suitable range finding mechanism so as to adjust the nut 86b and the universal joint connection 86a as a function of range.

It will be observed that when the elevation gear 129 rotates the frame 110, the movement of the frame in carrying the disks 87 and 105 with it would adjust this member axially due to the interaction of the gears 121 and 122, and 125 and 126; this, of course, would introduce errors in the azimuth positions of the plates 87 and 105 and into the radial offset of the pin 96. Therefore, it will be understood that suitable unwinding mechanism of any well-known character, such as differential devices or electrically interconnecting devices, will be interposed in the drives of the two gears 124 and 128 in order to add the angle of elevation $\epsilon$ and thereby obviate these errors. Therefore, the total input to gear 124 is the altitude and air speed vector plus the elevation angle $\epsilon$ plus a multiple of the azimuth angle $\theta$ which is the ratio of the number of teeth on gear 121 to the number of teeth on gear 122; the total input to gear 128 is the elevation angle $\epsilon$ plus a multiple of the azimuth angle which is the ratio of the number of teeth on gear 125 to the number of teeth on gear 126; while the input to gear 129 is elevation angle $\epsilon$ alone.

The compensation for gravity is effected here by displacing the center of motion of the resolver bar 86 in the universal mounting 89 from the elevation axis of the member 110 in a direction parallel to the azimuth axis. This setting may be accomplished by the screw 114a. The spacing between this center and the axis is indicated by $g_1$ in Fig. 4.

Figure 18:
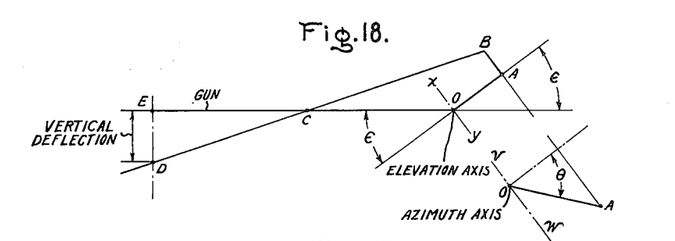
Figs. 18 and 18a illustrate vectorially the manner in which the mechanism shown in Figs. 4–8 operates.
Figure 18A:
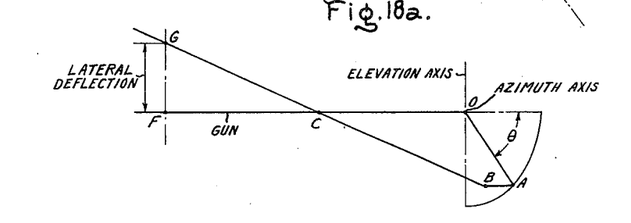

The vector analysis of the mechanism just described is shown in Figs 18 and 18a. Fig. 18 is a diagram illustrating the essential elements of the mechanism looking along the elevation axis, while Fig. 18a is a view looking at the plane of the elevation axis and the gun bore axis; in Fig. 18, the axis $x$—$y$ is the azimuth axis of rotation; the elevation axis of rotation is an axis perpendicular to the plane of the paper intersecting the axis $x$—$y$ at the point O. The vector OA corresponds to the wind vector, modified for variations in air density, that is, it is the radial offset of the pin 96 of the resolver rod 86 from the azimuth axis or the vertical axis of the azimuth disk 105. The vector AB corresponds to the distance $g'$. The vector OCE corresponds to the gun's bore axis, or is the axis of the adjustment screw 85b. The vector BCD is the resolver rod 86 and corresponds to the line of sight. The point C is the universal connection 86a interposed between the resolver rod 86 and the adjustment rod 85b. The angle $\epsilon$ is the angle of elevation of the gun. The gun's azimuth angle $\theta$ is shown in Fig. 18a, and while not seen in Fig. 18, it may be pictured by the folded plan projection shown below this section and which shows the vectors looking parallel to the azimuth axis; in this projection the azimuth axis is perpendicular to the plane of the paper at point O, while the elevation axis is designated $v$—$w$. Now the distance ED of Fig. 18 is proportional to the vertical deflection offset $\alpha$ required between the line of sight and the gun, and the mechanism will continuously generate the distance ED as the angles $\theta$ and $\epsilon$ vary, and in accordance with the value of the wind vector OA, and that of the range function set in at point C. Likewise, by referring to Fig. 18a, the distance FG, proportional to lateral deflection $\beta$, is constantly generated as the position of the gun changes in elevation and azimuth, as the range changes, and as the velocity vector OA changes. And likewise, the vertical and lateral deflections are corrected continuously for gravity, because of the offset position of the resolver bar center of movement from the elevation axis, and which is shown as vector AB.

It will be understood that the vertical and lateral deflections E—D and F—G of the Figs. 18 and 18a, respectively, may be taken off from the resolver rod 86 by any suitable mechanism (not shown). For example, the resolver rod may be provided with a sphere 130 which may correspond to the sphere 32 of the first form of this invention and which may be used to drive any suitable sight controlling mechanism.

The mechanism of Figs. 4 to 8, inclusive, may be used for other purposes. For example it may, as the first form, be used as a parallax mechanism. When so used, the radial offset of the pin 96 is adjusted in accordance with the horizontal base line distance between the gun and sighting stations; and the distance indicated by $g'$ will be adjusted axially by screw 114a in accordance with the vertical base line distance between the gun and sighting stations; and here also, the azimuth angle $\theta$ is measured from the horizontal parallax base line, rather than from the wind vector OA.

Figure 9:
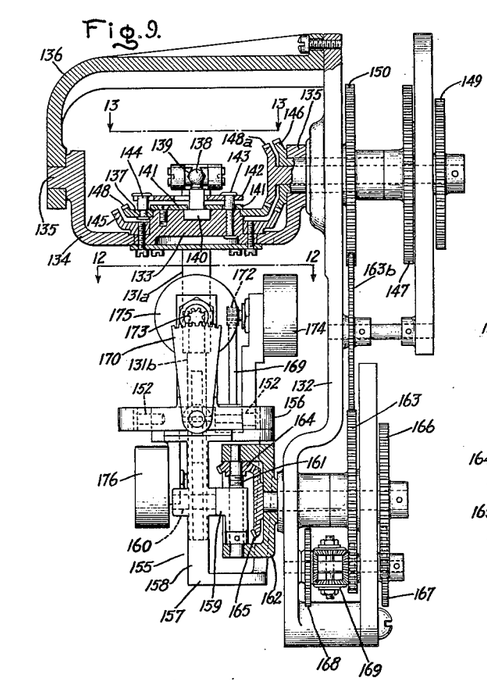
Fig. 9 is an elevation of still another form of this invention, parts being shown in section so as to illustrate certain details of construction.
Figure 10:
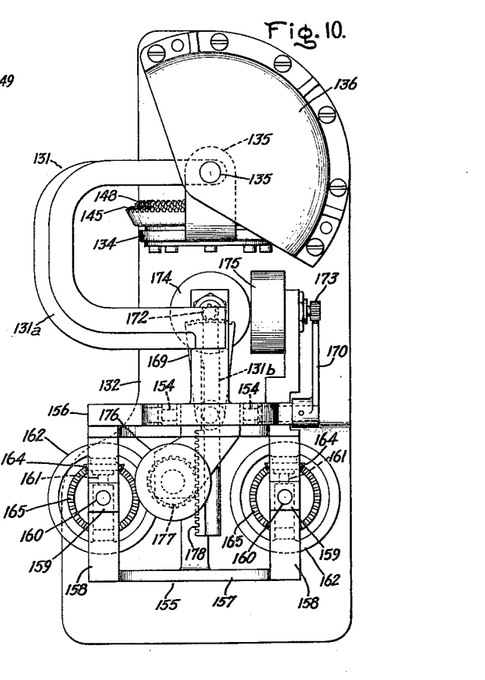
Fig. 10 is an end elevation of the mechanism shown in Fig. 9 looking from the left of this figure.
Figure 11:
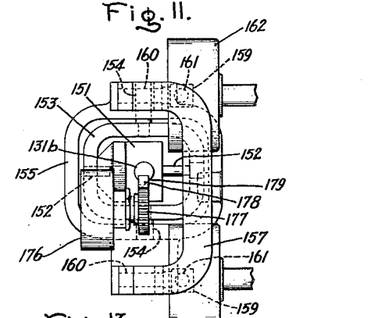
Fig. 11 is a bottom plan view of Figs. 9 and 10.
Figure 12:
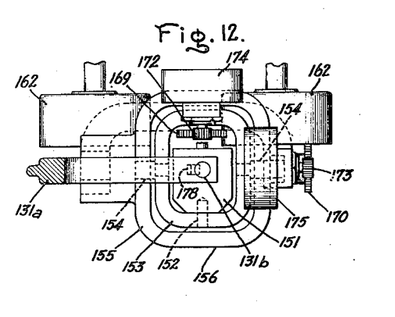
Fig. 12 is a plan view of a portion of the mechanism shown in Figs. 9 and 10 looking from the line 12—12 of Fig. 9.
Figure 13:
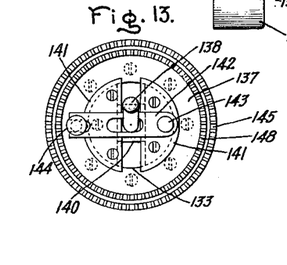
Fig. 13 is a plan view of a part of the mechanism shown in Figs. 9 and 10 looking from the line 13—13 of Fig. 9.
Figure 14:
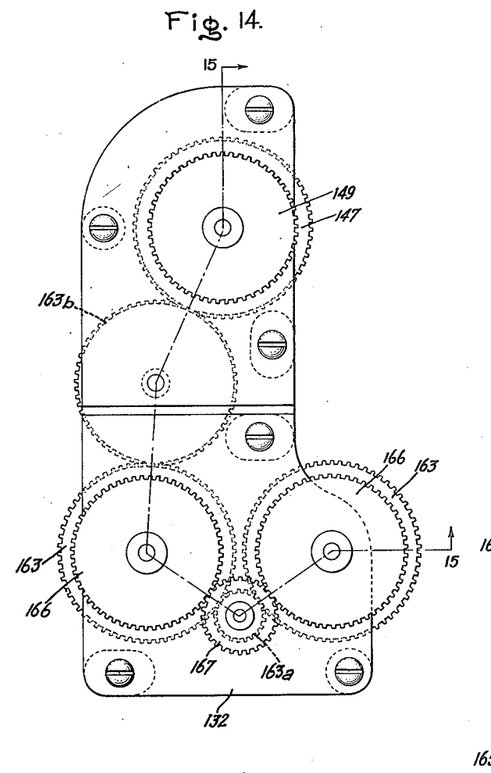
Fig. 14 is a side elevation of the mechanism shown in Fig. 9 looking from the right of this figure.
Figure 15:
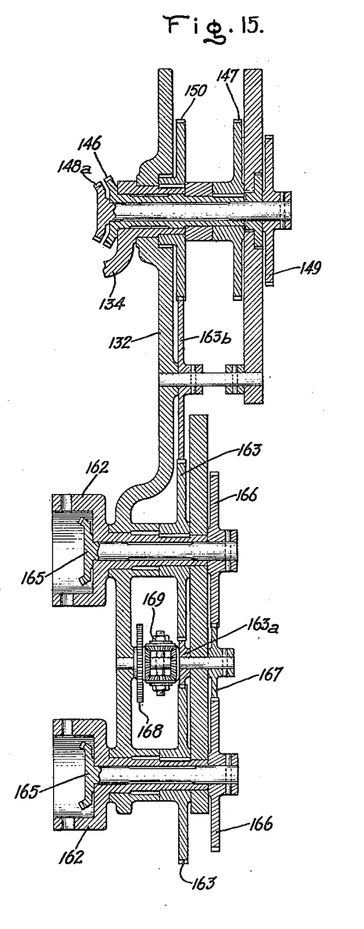
Fig. 15 is a sectional view taken through the line 15—15 of Fig. 14 and looking in the direction of the arrows.

In the form of the invention shown in Figs. 9–15, inclusive, there is provided a resolver bar 131 which has a U-shaped section 131a at the top and a depending straight section 131b at the bottom, all as viewed in Figs. 9 and 10.

In this form of the invention, the mimic gun is the supporting frame or base 132.

The motion of the resolver bar here also is controlled by a pair of bases, as in the first two forms. Here, the first base is a disk-like plate member 133 mounted for rotation on a fixed axis through its center on a base 134 which corresponds to the second base of the first two forms. This member 134 is generally of U-shape as shown in Fig. 9, and its two legs have trunnions 135 which are journaled in the frame 132 and in a standard 136 which is supported from the frame. It will be observed that the axis of rotation of the second base 134 is at right angles to and intersects the axis of rotation of the plate 133. The plate 133 supports a second rotatable member 137. Mounted for movement diametrically across the face of the plate 133 is a spherical member 138 upon which is mounted the upper end of the resolver bar 131. For this purpose, the upper end of the resolver bar 131 is provided with a socket 139 which coacts with the sphere 138, as clearly shown in Fig. 9.

The sphere 138 is mounted upon a slide block 140 which slides in a guideway provided for it across the diameter of the member 133 and which is retained by retainer plates 141.

The standard 140 and hence the sphere 138 are adjusted across the plate 133 by means of a lever 142 (Figs. 9 and 13) having one end pivoted to a pin 143 which is supported by the plate 133, as shown in Fig. 9; its opposite end is slotted and this end straddles a fixed stud 144 mounted in the rotatable plate 137.

It will be observed that when the two plates 133 and 137 rotate in unison through the same angle they will rotate the sphere 138 with them provided it be radially offset from the center. It will also be observed that if the two plates 133 and 137 be rotated relatively to each other that they will move the lever 142 in order to effect a radial adjustment in the position of the sphere 138.

The plate 133 supports a crown gear 145 which is driven by a gear 146 which in turn is driven by a spur gear 147. The second rotatable plate 137 likewise has a crown gear 148 which is driven by gear 148a from a spur gear 149. And the member 134 is driven by a gear 150.

The lower end 131b of the resolver bar 131 is directed through a gimbal ring system comprising an inner block 151 (Figs. 11 and 12) through which the resolver bar extension 131b is directed. This block 151 has aligned shafts 152 which are journaled in a gimbal ring 153 which in turn is provided with aligned shafts 154 which journal it in a frame 155 for movement on an axis at right angles to the axis of movement of the block 151. In other words, the resolver bar has a universal joint connection with the frame 155; and through this frame it is connected with the base 132.

As shown more clearly in Fig. 10, the frame 155 is generally of open-rectangular shape having an upper bar 156 which supports the universal connection just described, a lower parallel bar 157 and a pair of parallel side bars 158, all of the bars being preferably formed into a unitary structure.

The frame 155 has its two opposite legs 158 mounted upon blocks 159 by means of shafts 160. The blocks 159 in turn are mounted upon lead screws 161 which in turn are journaled in cup-shaped yokes 162. These yokes are journaled in the lower end of the frame 132 and are driven by gears 163. These gears are interconnected by an idler gear 163a and they are driven from gear 150 by means of an idler gear 163b. The lead screws 161 are adjusted to adjust the positions of blocks or nuts 159 radially with reference to the axes of rotation of the yokes 162, and for this purpose gears 164 are attached to the screws which gears are driven by gears 165 journaled within the journals of the supports 162, as clearly shown in Fig. 9, and which are driven by gears 166. The gears 166 are interconnected by means of a gear 167, and this gear in turn is driven by an input gear 168 through a differential 169, the purpose for which will be pointed out in detail hereinafter.

It will be observed that in view of the description thus far given, the rectangular frame 155 carrying the universal joint connection between this frame and the resolver bar 131 will be given a combined rotary and oscillatory motion, wherein the positions of the side arms 158 are always parallel to each other, when the yokes 162 are rotated, provided the axes of the pins 160 are offset by the nuts 159 from the axes of rotation of the yokes 162. This motion in turn will be imparted to the universal joint connection and hence to the resolver bar. If the axes of the shafts 160 coincide with the axes of rotation of the yokes 162, then of course the frame 155 remains stationary.

The motions of the two members 151 and 153 of the universal connection are taken off from the mechanism by means of a pair of gear segments 169 and 170, respectively, which are rigidly secured to the two respective members so that as they oscillate the gear segments oscillate with them about their respective axes of rotation. These gear segments operate spur gears 172 and 173, respectively, which operate suitable electrical motion measuring and transmitting devices 174 and 175, respectively.

Furthermore, in certain applications it is desirable to take off the relative longitudinal motion between the frame 155 and the resolver bar, and for this purpose, the block 151 of the universal joint connection supports a suitable motion transmitting element 176, which is driven by a gear 177 which meshes with a rack 178 provided on the lower end of the resolver bar, as shown. It will be observed more clearly by reference to Figs. 11 and 12 that the rack 178 is projected through a slot 179 in the block 151 so that relative rotary motion between the resolving bar and the block is prevented.

When the resolving mechanism of this form of the invention is utilized as a ballistic computer, the ballistic correction for wind, modified for air density, is introduced as before, by offsetting the sphere 138 radially with reference to the axis of rotation of the base gear 133. Here in addition the correction for range is introduced in this offset, rather than by means of an adjustment of the universal connection joint between the resolver bar and its control member—here the base 132, as is the case of the first two forms.

And here, the gravity correction instead of being introduced by offsetting the center of the sphere 138 from the axis of rotation of the second base member 134 and in a direction parallel to the azimuth axis, as in the first two forms, is introduced by adjusting the nuts 159 to offset the axes of the shafts 160 from the axes of rotation of the two yokes 162.

And here, the motion is taken off by means of the two transmitters 174 and 175 which are operated by the relative movement between the two gimbal sections 151 and 153, rather than by a direct mechanical connection, as in the first two forms of the invention described.

In the operation of this form of the invention as used as a ballistic computer, the angle of elevation $\epsilon$ is introduced by the gear 150 which drives the base 134 through this angle. At the same time, the two yokes 162 are driven through this angle, through the gearing 163b and 163 and 163a. The input to gear 147 which drives the plate 133 is elevation angle $\epsilon$ plus a multiple of the azimuth angle $\theta$ which is the ratio of the number of teeth on gear 145 to the number of teeth on gear 146. And the input to gear 149 which drives the plate 137 is the range and wind velocity vector plus the elevation angle $\epsilon$ plus a multiple of the azimuth angle $\theta$ which is a ratio of the number of teeth on gear 148 to the number of teeth on gear 148a. The reason that the angle $\epsilon$ is added to the inputs of gears 147 and 149 is exactly the same as in the second form, that is, in order to delete the error that would be introduced into the positions of the base 133 and the plate 137 by the rotation of the second base 134.

It will be further understood that an error would be set into the positions of the gravity nuts 159, as adjusted by the input gear 168, when the yokes 162 are rotated through the angle ε by the interaction between the gears 164 and 165; and to obviate this error the differential 169 adds the angle ε to the input of the gear 168.

Figure 19:
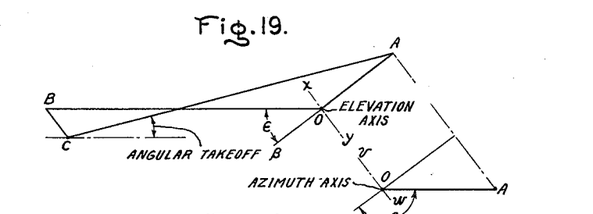
Figs. 19 and 19a illustrate vectorially the manner in which the mechanism shown in Figs. 9–15 inclusive operates.
Figure 19A:
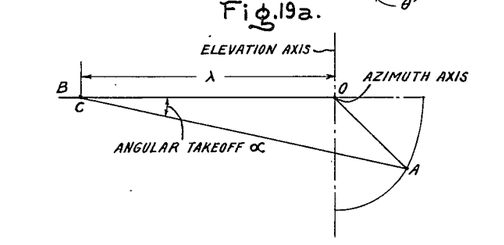

The essential elements of the mechanism shown in Figs. 9–14 are shown vectorially in Figs. 19 and 19a in which Fig. 19 shows the elements in elevation and Fig. 19a shows them in plan. In Fig. 19 the elevation axis passes perpendicularly through the plane of the paper at the point O, whereas the azimuth axis is indicated by the line x—y. Here as before, the figure immediately below Fig. 19a is a view looking parallel to the azimuth axis; in other words, the azimuth axis is perpendicular to the plane of the paper intersecting it at the point O, and the elevation axis is indicated by the line v—w. Furthermore, here the vector AC represents the line of sight, or the resolver bar 131, while the vector OB represents the control member, or the frame 132. The vector OA represents the radial offset of the sphere 138 with reference to the axis of rotation of the base 133, and is the vector which introduces wind, modified for air density, and also range. And vector BC is the gravity correction which is introduced into the setting of the nuts 159. The device functions in accordance with the elevation angle ε, the azimuth angle θ, wind and range vector OA, and gravity vector BC to generate the lateral deflection offset angle α and the vertical deflection offset angle β, which angles are indicated in Figs. 19 and 19a.

When this device is used for parallax correction, the vector OA is adjusted in accordance with the horizontal base length between the sighting and gun stations, divided by range; while the offset of the nuts 159 is adjusted in accordance with the length of the vertical base line between the sighting and gun stations, divided by range.

What I claim as new and desire to secure by Letters Patent of the United States, is:

1. A resolving mechanism comprising a first base rotatable about a predetermined axis, a second base mounted on said first base for rotation relatively to said first base about a predetermined axis, means for adjusting said bases relative to each other about their axes of rotation, a resolver bar, a mount for said bar connecting it with said second base and providing for relative angular motion of said bar and said base in a conical path about the mount as a center, means for adjusting the position of said mount radially with reference to the axis of rotation of said second base in a plane at right angles to said axis, a control member, a mount for said control member connecting it to said first base for relative pivotal movement about a fixed axis extending at right angles to and intersecting said axis of rotation of said first base, a universal joint connecting said resolver bar and control member providing for relative angular motion between them, and means for adjusting said universal joint lengthwise of said bar and control member but in a direction parallel to said control member, the angular relation of said bar and control member depending upon the relative angular positions of said bases on their axes of rotation, the radial position of said mount with relation to said axis of rotation of said second base, the relative angular positions of said control member and said first base, and further upon the adjustment of said universal joint lengthwise of said control member.

2. A resolving mechanism comprising a first base rotatable about a predetermined axis, a second base mounted on said first base for rotation relative to said first base about a predetermined axis, means for rotating said bases relative to each other, a resolver bar, a universal joint connection for said bar connecting it with said second base and providing for relative angular motion of said bar and said second base in a conical path about the universal joint connection as a center, means for adjusting the position of said universal joint connection radially with reference to the axis of rotation of said second base in a plane at right angles to said axis and also axially in the same direction as said axis, a control member, a mount for said control member connecting it to said first base for relative pivotal movement about a fixed axis extending at right angles to and intersecting said axis of rotation of said first base, a second universal joint connecting said resolver bar and control member providing for relative angular motion between them, and means for adjusting said universal joint lengthwise of said bar and control member but in a direction parallel to said control member, the angular relation of said bar and control member depending upon the relative angular positions of said bases, the radial position of said first universal joint connection with relation to said axis of rotation of said second base and its adjustment along said axis, the relative angular positions of said control member and said first base, and further upon the adjustment of said second universal joint connection lengthwise of said control member.

3. Mechanism for determining the angular relation between the bore of a gun mounted on a moving craft with relation to the line of sight of a gun controlling sighting structure mounted on said craft comprising an azimuth disk, a resolver bar having a longitudinal axis that represents said line of sight, a universal joint connection securing said bar to said disk providing for universal relative angular motion between the bar and disk throuhgout a predetermined cone with the center of motion located in said universal joint connection, means for adjusting the position of said universal joint connection radially on said disk with relation to an azimuth axis at right angles to the plane of said disk and which azimuth axis corresponds to the azimuth axis of said gun, a mimic gun having a longitudinal axis representing the bore of said gun, a member connected with said azimuth disk relatively rotatable with reference to it about said azimuth axis, means pivotally interconnecting said mimic gun and said member providing for relative movement between them about an axis intersecting said azimuth axis at right angles to it and representing the elevation axis of said gun, a second universal joint connection between said resolver bar and mimic gun and means for adjusting it lengthwise of said members but in a path parallel to the longitudinal axis of said mimic gun, means for relatively moving said azimuth disk and member through the azimuth angle of said gun, means for relatively moving said member and mimic gun through the angle of elevation of said gun, means for radially offsetting said first-named universal joint connection from said azimuth axis of said disk in accordance with the velocity of said craft, and means for adjusting said second named universal connection lengthwise of said mimic gun in accordance with a function of the range of the target.

4. Mechanism for determining the angular relation between the bore of a gun mounted on a moving craft with relation to the line of sight of a gun controlling sighting structure mounted on said craft comprising an azimuth disk, a resolver bar having a longitudinal axis that represents said line of sight, a universal joint connection between said bar and disk providing universal relative angular motion between the bar and disk throughout a predetermined cone with the center of motion located in said universal joint connection, means for adjusting the position of said universal joint connection radially with relation to an azimuth axis at right angles to the plane of said disk and representing the azimuth axis of said gun, a mimic gun having a longitudinal axis representing the bore of said gun, a member mounted for rotation relatively to said azimuth disk about said azimuth axis, means pivotally interconnecting said mimic gun and said member providing for relative movement between them about an axis intersecting said azimuth axis at right angles to it and representing the elevation axis of said gun, a universal joint between said resolver bar and mimic gun, means for adjusting it lengthwise of said resolver bar and mimic gun but in a path parallel to the longitudinal axis of said mimic gun, means for relatively moving said azimuth disk and member through the azimuth angle of said gun, means for relatively moving said member and mimic gun through the angle of elevation of said gun, means for radially offsetting said universal joint connection for said resolver bar from said azimuth axis of said disk in accordance with the velocity of said craft, means for adjusting said universal joint lengthwise of said mimic gun in accordance with a function of the range of a target, and said means that pivotally connect said mimic gun with its said member locating the axis of relative movement of said mimic gun with relation to said member at a predetermined distance from said center of motion of said resolver bar with relation to said azimuth disk in order to introduce a predetermined correction between said longitudinal axes of said resolver bar and mimic gun.

5. Mechanism for determining the angular relation between the bore of a gun mounted on a moving aircraft with relation to the line of sight of a gun controlling sighting structure mounted on said aircraft comprising an azimuth disk, a resolver bar having a longitudinal axis representing said line of sight, a universal joint connection between said bar and azimuth disk providing for universal relative angular motion between the bar and disk throughout a predetermined cone with the center of motion located in said universal joint connection, means for attaching said universal joint connection on said azimuth disk and providing for movement thereof transversely across a diameter of said disk to adjust it with relation to an azimuth axis of said disk located in the center thereof and at right angles to its plane, means for adjusting said universal joint connection on said diameter and for holding it in the adjusted position, said adjusting means being settable in terms of altitude and air speed of said aircraft, a mimic gun having a longitudinal axis representing the bore of said gun, a base relatively rotatable with reference to said azimuth disk about said azimuth axis, means pivotally interconnecting said mimic gun and said base for relative movement about an axis intersecting said azimuth axis at right angles to it and representing the elevation axis of said gun, a universal connection joint between said resolver bar and mimic gun, means for adjusting said second-named universal joint connection lengthwise of said resolver bar and mimic gun but in a path parallel to the longitudinal axis of said mimic gun, means for relatively moving said azimuth disk and mimic gun base through the azimuth angle of said gun, means for relatively moving said base and mimic gun through the angle of elevation of said gun, means for adjusting said second-named universal joint connection lengthwise of said mimic gun in accordance with a function of the range of a target, and said center of motion of said resolver bar being displaced with reference to said axis of elevation of said mimic gun to adjust the angularity of said resolver bar and mimic gun in terms of the force of gravity acting on a projectile fired from said gun.

6. A resolver mechanism comprising a first base, a second base upon which said first base is pivoted for rotary motion thereon on a predetermined axis with reference to the second base, means mounting said second base for rotation on an axis intersecting said first-named axis at right angles to it, a control member secured to said mounting means for rotation on an axis in fixed relation thereto, a resolver bar, a universal joint between said resolver bar and said control member, and means connecting said resolver bar with said first base including a universal connection and an arm connecting said universal connection with said first base, and means for adjusting the radial offset of the point of connection of said arm on said first base with reference to said predetermined axis.

7. Resolver mechanism comprising a fixed frame, first and second bases, the first being mounted on the second for rotation thereon on an axis fixed with reference to the second base, means mounting said second base on said frame for rotation on an axis at right angles to and intersecting said first-named axis, a control member adjacent said bases and journaled in said frame for rotation on its longitudinal axis which axis is fixed with relation to said frame and is at right angles to the axis of rotation of said second base, a resolver bar positioned adjacent said bases and said control member, a universal joint connection intermediate the ends of said bar connecting said bar with said control member, said control member connected to said universal joint connection so that when the member is rotated on its longitudinal axis it adjusts the position of said universal joint connection lengthwise of and parallel to the axis of rotation of said control member, a pin mounted on said first base for movement with reference to it across a diameter thereof, means for adjusting said pin along said diameter, a pair of members mounted on said second base and connected together for relative movement at right angles to each other and one of said members being connected to said pin, and a universal joint connection between said one member and one end of said resolver bar so that the angular relation of said bar with reference to said control member depends upon the position of said bases relative to each other, upon the position of said second base relative to said frame, upon the radial offset of said pin, and finally upon the position of said first-named universal joint connection along the length of said control member.

8. Resolver mechanism comprising a fixed frame, first and second bases, the first being mounted on the second for rotation thereon on an axis fixed with reference to the second base, means mounting said second base on said frame for rotation on an axis at right angles to and intersecting said first-named axis, a control member positioned adjacent said bases and journaled in said frame for rotation on its longitudinal axis which axis is fixed with relation to said frame, a resolver bar positioned adjacent said bases and said control member, a universal joint connection intermediate the ends of said bar connecting said bar with said control member, said control member connected to said universal joint connection so that when the control member is rotated on its longitudinal axis it adjusts the position of said joint lengthwise of and parallel to the control member, a pin mounted on said first base for movement with reference to it across a diameter thereof, means for adjusting said pin along said diameter, and means for connecting said pin with one end of said resolver bar so that the motion of said pin along said diameter and its motion due to the rotation of said two bases on their two axes is transmitted to said bar to swing it angularly on its universal joint connection with said control member.

9. A resolving mechanism comprising a pair of bases relatively rotatable about a predetermined common axis, a resolver member, a universal joint connection connecting said resolver member with the first of said bases providing for relatively angular motion between said member and base, means for adjusting said universal joint connection with reference to said first base normally to said axis of rotation, a control member, means connecting said control member with the second base and providing for pivotal relative movement between them on an axis intersecting and at right angles to said first-named axis, a universal joint connection between said resolver and control members to provide for relative angular movement between them, said last-named universal joint connection comprising a pair of members connected together for movement about one axis and means mounting one of them for movement about another axis at right angles to said one axis, and a pair of motion take-off devices operated by said pair of members respectively.

JOHN R. MOORE.

REFERENCES CITED

The following references are of record in the file of this patent:

UNITED STATES PATENTS

| Number | Name | Date |
|---|---|---|
| 371,286 | Stuart | Oct. 11, 1887 |
| 547,423 | Driggs | Oct. 8, 1895 |
| 2,183,530 | Alkan | Dec. 19, 1939 |
| 2,372,613 | Svoboda | Mar. 27, 1945 |

FOREIGN PATENTS

| Number | Country | Date |
|---|---|---|
| 8,828 | Great Britain | 1894 |
| 125,108 | Great Britain | Apr. 17, 1919 |
| 291,096 | Italy | Dec. 9, 1931 |
| 374,930 | Great Britain | June 16, 1932 |
| 607,188 | Germany | Dec. 19, 1934 |